US008780979B2

(12) United States Patent
Huang et al.

(10) Patent No.: US 8,780,979 B2
(45) Date of Patent: Jul. 15, 2014

(54) QUANTIZED COEFFICIENT CODING APPARATUS AND QUANTIZED COEFFICIENT CODING METHOD

(75) Inventors: Yi-Chin Huang, Hsinchu Hsien (TW); Yi-Shin Tung, Hsinchu Hsien (TW); Chia Chiang Ho, Hsinchu Hsien (TW); Yu-Cheng Lin, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 383 days.

(21) Appl. No.: 13/009,146

(22) Filed: Jan. 19, 2011

(65) Prior Publication Data

US 2011/0286515 A1    Nov. 24, 2011

(30) Foreign Application Priority Data

May 19, 2010    (TW) .............................. 99116006 A (51) Int. Cl.
*H04N 7/26* (2006.01)
*H04N 7/50* (2006.01)

(52) U.S. Cl.
CPC ...................................... *H04N 7/50* (2013.01)
USPC .................................................. 375/240.03

(58) Field of Classification Search
CPC ....................................................... H04N 7/50
See application file for complete search history.

(56) References Cited

U.S. PATENT DOCUMENTS

2005/0276498 A1 * 12/2005 Chen et al. ..................... 382/245
2008/0074296 A1 *  3/2008 Kadono et al. .................. 341/67
2009/0074057 A1 *  3/2009 Marpe et al. ............. 375/240.02

FOREIGN PATENT DOCUMENTS

EP    1100272 A2 *  5/2001 ............... H04N 7/50

OTHER PUBLICATIONS

Taiwan Office Action, May 22, 2013, 6 pages.
Pao et al., "Encoding Stored Video for Streaming Applications", IEEE Transactions on Circuits and Systems for Video Technology, vol. 11, No. 2, Feb. 2001, pp. 199-209.
Yang et al., "Joint Optimization of Run-Length Coding, Huffman Coding, and Quantization Table With Complete Baseline JPEG Decoder Compatibility", IEEE Transactions on Image Processing, vol. 18, No. 1, Jan. 2009, pp. 63-74.

* cited by examiner

*Primary Examiner* — Sath V Perungavoor
*Assistant Examiner* — Kate Luo
(74) *Attorney, Agent, or Firm* — Edell, Shapiro & Finnan, LLC (57) ABSTRACT

A quantized coefficient coding apparatus used in a media coding system includes a determination module, a coding mode arbitration module and a coding module. The determination module determines whether a set of quantized coefficients are defined in a predetermined variable length coding (VLC) table to generate a determination result. When the determination result of the determination module is negative, the coding mode arbitration module determines a best coding mode corresponding to the set of quantized coefficients from a plurality of predetermined coding modes. The coding mode encodes the set of quantized coefficients according to the best coding mode.

15 Claims, 8 Drawing Sheets

QUANTIZED COEFFICIENT CODING APPARATUS AND QUANTIZED COEFFICIENT CODING METHOD

CROSS REFERENCE TO RELATED PATENT APPLICATION

This patent application is based on Taiwan, R.O.C. patent application No. 099116006 filed on May 19, 2010.

FIELD OF THE INVENTION

The present invention relates to an apparatus and method for media coding, and more particularly, to a media coding system, a quantized coefficient coding apparatus and a quantized coefficient coding method configured to select a best variable length coding (VLC) mode corresponding to a set of quantized coefficients, so as to achieve an optimized coding efficiency.

BACKGROUND OF THE INVENTION

In a conventional Motion Picture Experts Group-4 (MPEG-4) media coding system, a set of quantized discrete cosine transform (DCT) coefficients comprises three DCT coefficients "run", "level" and "last", represented in format of (run, level, last), and is encoded with a variable length coding (VLC) approach. Generally, the VLC approach adopts a VLC table to encode a set of the quantized DCT coefficients (run, level, last).

In practice, the VLC table has two types—an intra-coded table and an inter-coded table. The intra-coded table is adopted to encode two macro-blocks in a same frame when two adjacent frames in a video stream have no approximate macro-blocks. The inter-frame coding table is adopted to encode two macro-blocks of adjacent frames when two adjacent frames in the video stream have at least one approximate macro-block.

Figure 1:
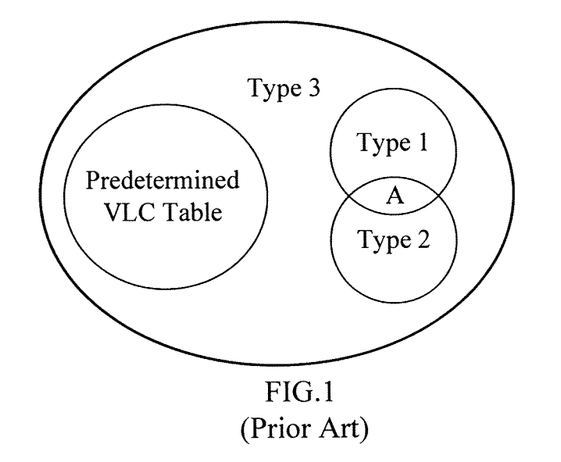
FIG. 1 is a schematic diagram of relative relationship of application scopes between the VLC table and three other VLC modes.

Reference is made to FIG. 1, which is a schematic diagram of relative relationship of application scopes between the VLC table and three other VLC modes. As shown in FIG. 1, since the number of sets of quantized DCT coefficients defined in the VLC table is limited, except the set of the quantized DCT coefficients (run, level, last) defined in the predetermined VLC table, other sets of quantized DCT coefficients are respectively adopted in three types of escape coding modes Type 1, Type 2 and Type 3. Type 3, a fixed-length escape coding mode, has a widest application scope that covers all sets of quantized DCT coefficients. Type 1, an escape coding mode for coefficient "level", and Type 2, an escape coding mode for coefficient "run", are respectively applicable to a portion of the sets of quantized DCT coefficients. Please note that the application scope of Type 1 and that of Type 2 are partly overlapped. As can be seen from a scope A in FIG. 1, the sets of quantized DCT coefficients within the scope A are adopted for encoding in both Type 1 and Type 2.

Figure 2:
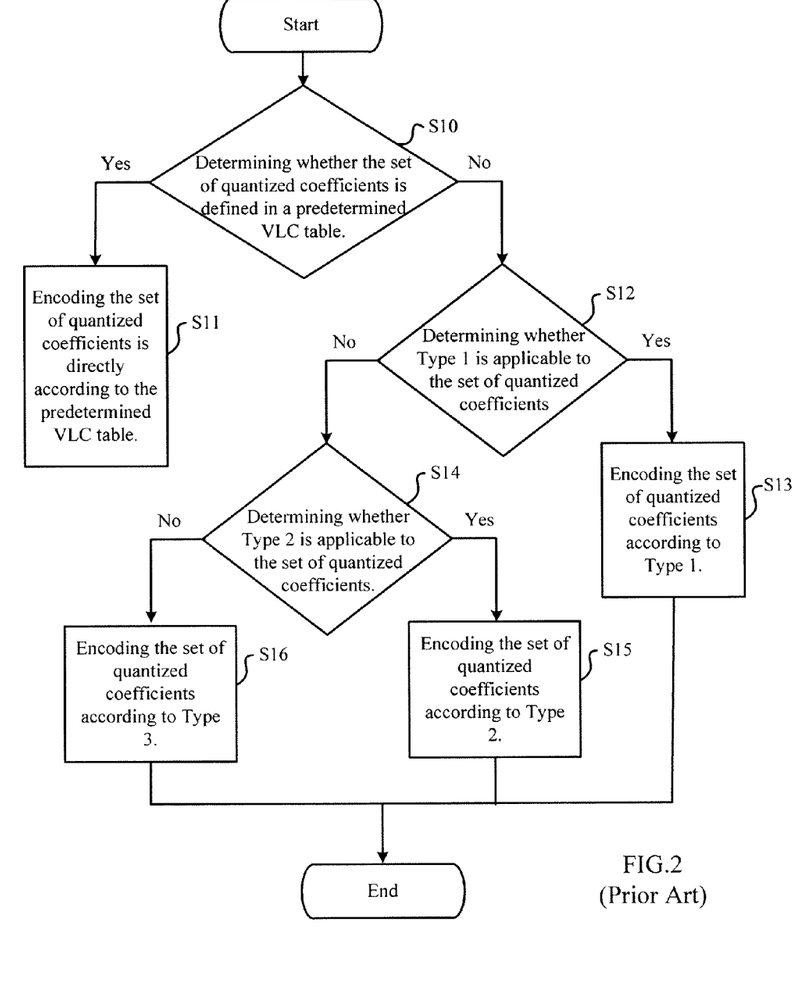
FIG. 2 is a flowchart of a conventional media coding system performing encoding of a set of quantized coefficients.

Reference is made to FIG. 2, which is a flowchart of a conventional media coding system performing encoding of a set of quantized coefficients. In Step S10, the process determines whether the set of quantized coefficients is defined in a predetermined VLC table. When a determination result of Step S10 is positive, the process proceeds to Step S11, in which the set of quantized coefficients is directly encoded according to the predetermined VLC table. When the determination result of Step S10 is negative, which means the predetermined VLC table does not comprise coding information of the set of the quantized coefficients, the set of quantized coefficients cannot be encoded with the predetermined VLC table.

The process proceeds to Step S12, for determining whether the first VLC mode Type 1 is applicable to the set of quantized coefficients. When a determination result of Step S12 is positive, the process proceeds to Step S13, in which the set of quantized coefficients is encoded according to the first VLC mode. When the determination result of Step S12 is negative, the process proceeds to Step S14, for determining whether the second VLC mode (Type 2) is applicable to the set of quantized coefficients. When a determination result of Step S14 is positive, the process proceeds to Step S15, in which the set of quantized coefficients is encoded according to the second VLC mode. Since the third VLC mode Type 3 is applicable to all sets of quantized coefficients, if the determination result of Step S14 is negative, the process proceeds to Step S16 in which the set of quantized coefficients is encoded according to the third VLC mode Type 3.

It is noted that the execution sequence of Step S12, for determining whether the first VLC mode is applicable to the set of quantized coefficients, and Step S14, for determining whether the second VLC mode is applicable to the set of quantized coefficients, can be exchanged. That is, the determination sequence of Type 1 and Type 2 is not limited; however, the exchange of sequence may lead to different determination results.

However, for sets of quantized coefficients adopted in both of the VLC modes Type 1 and Type 2 (i.e., the sets of quantized coefficients covered by the scope A in FIG. 1), a non-best coding mode may be selected from the VLC modes Type 1 and Type 2 when the above approach is adopted; i.e., a coding length obtained from encoding the set of quantized coefficients according to the non-best coding mode is not the shortest coding length, thereby the best coding efficiency cannot be achieved.

For example, supposing that the set of quantized DCT coefficients (run, level, last) is (2, 8, 0), which is adopted in both of the VLC modes Type 1 and Type 2 and defined in the intra-coded table. According to the prior art, Type 1 is selected to encode the set of quantized DCT coefficients to obtain a coding result of "0000011, 0, 000011110s" having a coding length of 18 bits. However, in practice, when Type 2 is adopted to encode the set of quantized DCT coefficients, the coding result is "0000011, 10, 010011s", having a coding length of only 16 bits.

As can be seen from the above, when a coding mode is selected according to the prior art to encode a set of quantized DCT coefficients, the obtained coding result may not have the shortest coding length, thereby the best coding efficiency cannot be achieved. In addition, when the best coding mode is selected by the above rules, it not only cannot ensure the best coding mode, but also extremely complicates software and hardware of the conventional media coding system and thereby results in increase of practical production cost.

Therefore, one main object of the present invention is to provide a media coding system, a quantized coefficient coding apparatus and a quantized coefficient coding method to solve the above problem.

SUMMARY OF THE INVENTION

According to a first embodiment of the present invention, a quantized coefficient coding apparatus applicable to a media coding system comprises a determination module, a coding mode arbitration module and a coding module. The determination module determines whether a set of quantized coefficients is defined within a predetermined variable length coding (VLC) table to generate a determination result. When the determination result of the determination module is negative, the coding mode arbitration module determines a best coding mode corresponding to the set of quantized coefficients from a plurality of predetermined coding modes according to a predetermined rule. The coding module encodes the set of quantized coefficients according to the best coding mode.

According to a second embodiment of the present invention, a quantized coefficient coding method applied to a media coding system comprises determining whether a set of quantized coefficients is defined within a predetermined VLC table to generate a determination result; determining a best coding mode corresponding to the set of quantized coefficients from a plurality of predetermined coding modes according to a predetermined rule when the determination result is negative; and encoding the set of quantized coefficients according to the best coding mode.

In conclusion, a quantized coefficient coding apparatus provided by the present invention is configured to accurately select a best coding mode corresponding to a set of quantized DCT coefficients and perform VLC on the set of quantized DCT coefficients according to the best coding mode, so as to ensure that the set of DCT coefficients encoded with the best coding mode has the shortest coding length to achieve best coding efficiency of the quantized DCT coefficients. In addition, a rule adopted by the quantized coefficient coding apparatus to determine the best coding mode is extremely simple, so as to effectively simplify software and hardware design of a media coding system, and thereby reduce practical production cost as well as increase market competitiveness.

The following description and figures are disclosed to gain a better understanding of the advantages of the present invention.

DETAILED DESCRIPTION OF THE PREFERRED EMBODIMENT

Figure 3:
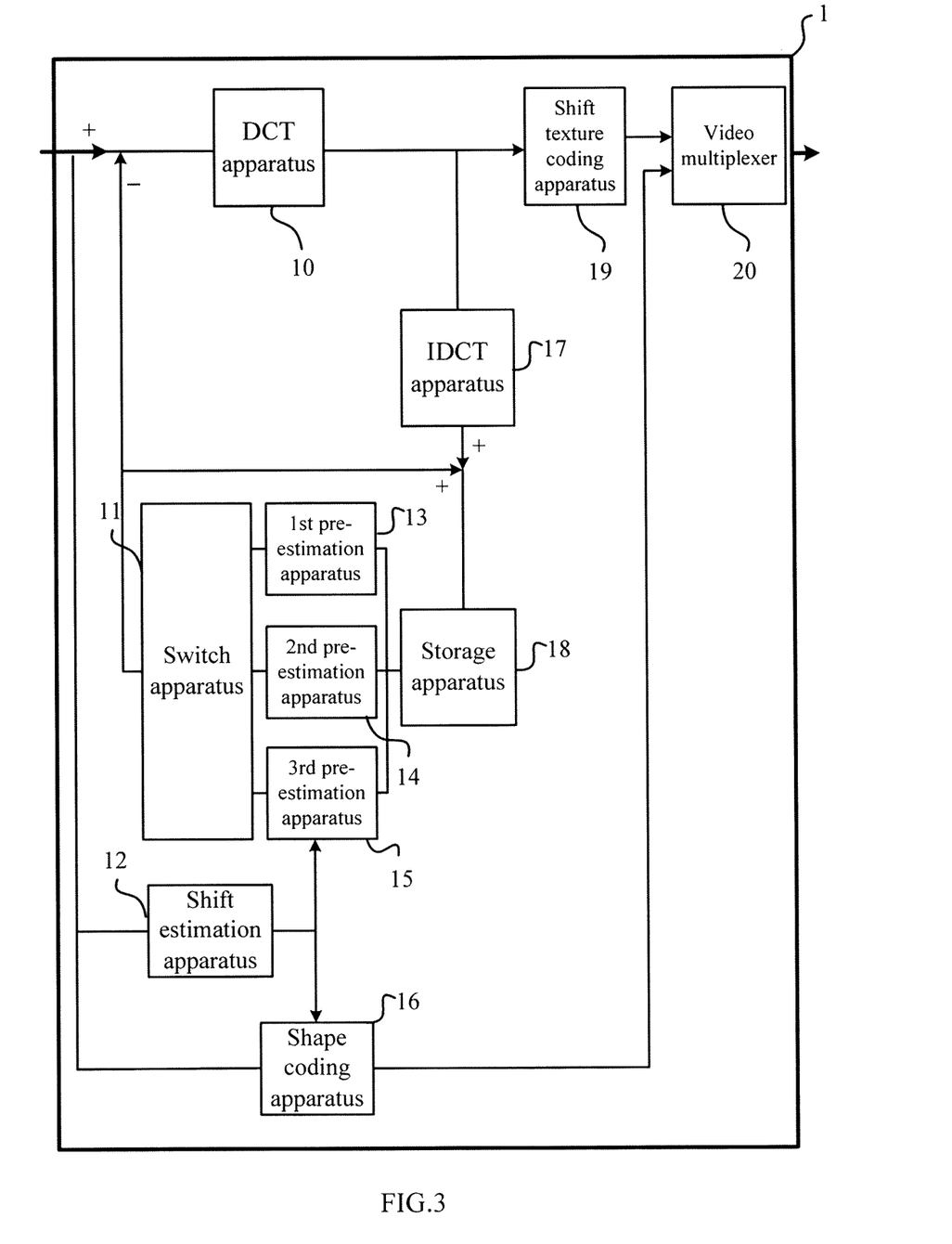
FIG. 3 is a block diagram of a media coding system in accordance with a first embodiment of the present invention.

A first embodiment according to the present invention is a media coding system, utilized for encoding a video stream. FIG. 3 is a block diagram of the media coding system in accordance with the first embodiment. A media coding system 1 comprises a discrete cosine transform (DCT) apparatus 10, a switch apparatus 11, a shift estimation apparatus 12, a first pre-estimation apparatus 13, a second pre-estimation apparatus 14, a third pre-estimation apparatus 15, a shape coding apparatus 16, an inverse discrete cosine transform (IDCT) apparatus 17, a storage module 18, a texture coding apparatus 19, and a video multiplexer 20.

The key issue of the present invention lies in the texture coding apparatus 19 of the media coding system 1. The following description provides details of a structure and operation principles of the texture coding apparatus 19. The remainder of the media coding system 1 is well-known for those skilled in the art and is therefore omitted herein.

Figure 4:
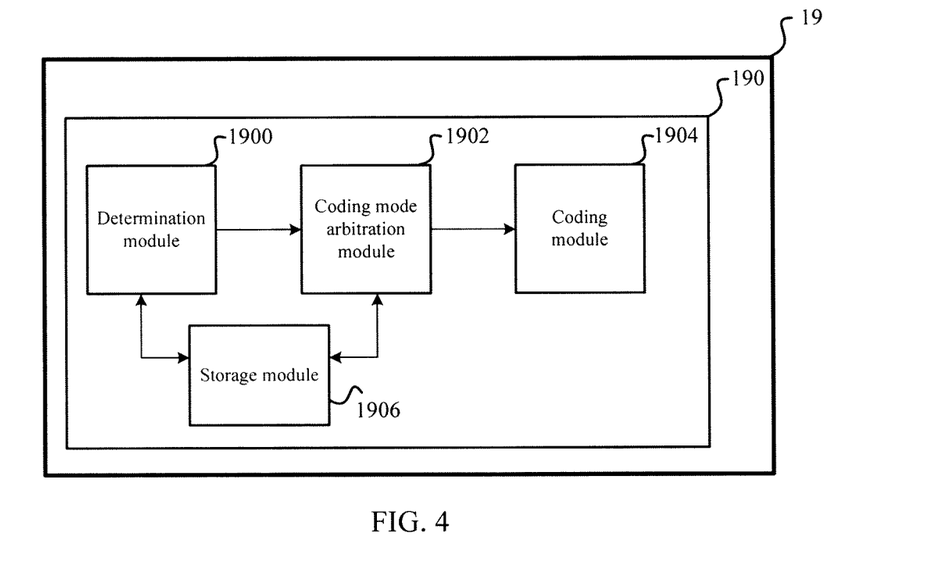
FIG. 4 is a block diagram of detailed functions of the quantized coefficient coding apparatus in FIG. 3 in accordance with an embodiment of the present invention.

FIG. 4 is a block diagram of detailed functions of the texture coding apparatus 19 in FIG. 3 in accordance with an embodiment of the present invention. Since a main function of the texture coding apparatus 19 is performing encoding of a set of quantized DCT coefficients processed via the DCT apparatus 10, the texture coding apparatus 19 comprises a quantized coefficient coding apparatus 190 to facilitate the process of encoding.

As shown in FIG. 4, the quantized coefficient coding apparatus 190 comprises a determination module 1900, a coding mode arbitration module 1902, a coding module 1904, and a storage module 1906. In that, the determination module is coupled to the coding mode arbitration module 1902 and the storage module 1906, and the coding mode arbitration module 1902 is coupled to the coding module 1904 and the storage module 1906. In this embodiment, when the DCT apparatus 10 transmits a set of quantized DCT coefficients to the quantized coefficient coding apparatus 190, the determination module 1900 deter mines whether the set of quantized DCT coefficients is defined in a predetermined VLC table.

When a determination result of the determination module 1900 is positive, i.e., when the set of quantized DCT coefficients is defined in the VLC table, the coding module 1904 encodes the set of quantized DCT coefficients according to coding information recorded in the predetermined VLC table. In practical applications, if the media coding system 1 is an MPEG-4 media coding system, the predetermined VLC table complies with the MPEG-4 video coding standard. However, the present invention is not limited thereto.

On the contrary, when the determination result of the determination module is negative, i.e., when the set of quantized DCT coefficients are not defined in the VLC table, the coding module 1904 cannot encode the set of quantized DCT coefficients according to the coding information recorded in the predetermined VLC table. Meanwhile, the coding mode arbitration module 1902 determines a best escape coding mode corresponding to the set of quantized DCT coefficients among three predetermined escape coding modes according to a predetermined rule.

In practical applications, the above-mentioned predetermined rule is associated with coding lengths obtained by respectively encoding the set of DCT coefficients via three types of different predetermined escape coding modes (i.e., Type 1, Type 2 and Type 3). More specifically, the predetermined rule is that, when the shortest coding length is obtained by encoding the set of DCT coefficients via one of the predetermined escape coding modes Type 1, Type 2 and Type 3, the one of the predetermined escape coding modes is determined to be the best coding mode corresponding to the set of quantized DCT coefficients.

In practice, since each set of quantized DCT coefficients and a corresponding best coding mode can be estimated in advance and stored in a look-up table, in this embodiment, the storage module 1906 stores a VLC best solution table, which records each set of quantized DCT coefficients and a corresponding best coding mode, for providing the coding mode arbitration module 1902 to arbitrate a best coding mode.

Figure 5:
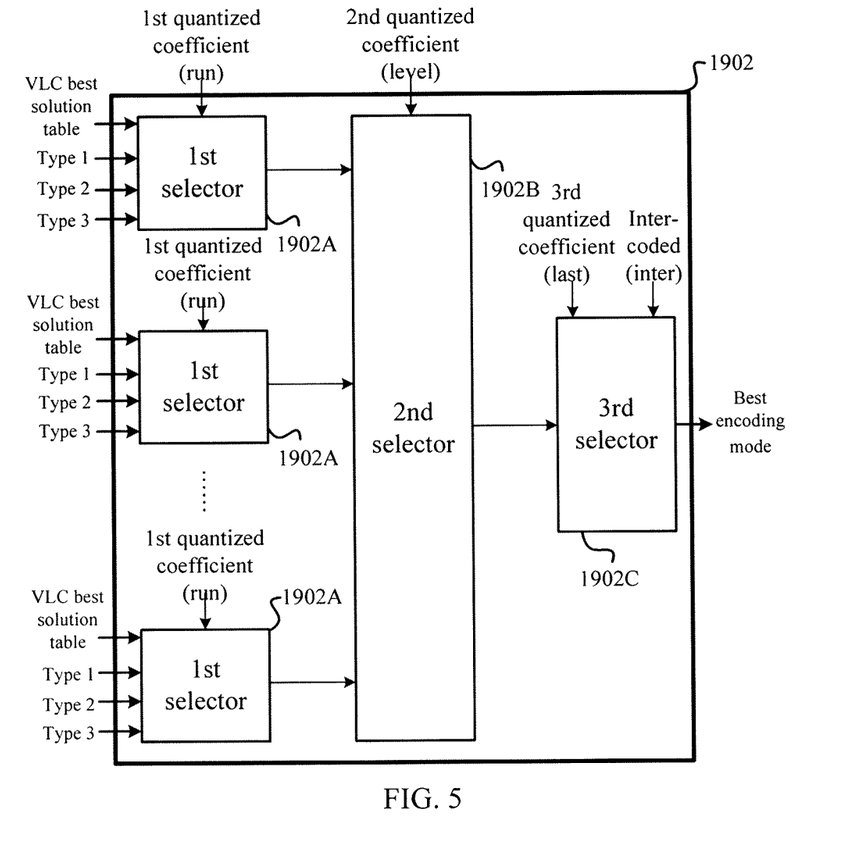
FIG. 5 and FIG. 6 are schematic diagrams of two different operating approaches of the coding mode arbitration module in FIG. 4 in accordance with an embodiment of the present invention.

A structure and an operating approach of the coding mode arbitration module 1902 are further discussed below. FIG. 5 is a detailed functional block diagram of the coding mode arbitration module 1902. The coding mode arbitration module 1902 comprises a first selector 1902A, a second selector 1902B and a third selector 1902C. The first selector 1902A is coupled to the second selector 1902B, and the second selector 1902B is coupled to the third selector 1902C. The number of the first selector 1902A may be one or more, depending on practical operating requirements.

In this embodiment, the first selector 1902A accesses the VLC best solution table from the storage module 1906 to obtain associated information of a best coding mode corresponding to a set of quantized DCT coefficients. Subsequently, the first selector 1902A performs matching on a first quantized coefficient "run" of the set of quantized coefficients according to the above information. The second selector 1902B performs matching on a second quantized coefficient "level" of the set of quantized coefficients according to the above information. The above operations are referred to hereinafter as a "two-layer matching process."

Supposing that the set of quantized DCT coefficients is simultaneously adopted in the two coding modes Type 1 and Type 2, via the two-layer matching process, it can be determined which one of the coding modes Type 1 and Type 2 is the best coding mode corresponding to the set of quantized DCT coefficients. Supposing that after the two-layer matching process, it is discovered that neither Type 1 nor Type 2 is the best coding mode corresponding to the set of quantized DCT coefficients, the third selector 1902C determines that Type 3, having a widest application scope, is determined as the best coding mode corresponding to the set of quantized DCT coefficients, accordingly. In addition, besides performing matching of the third quantized coefficient "last", the third selector 1902C also determines whether the best coding mode is the inter-coded table or the intra-coded table.

Figure 6:
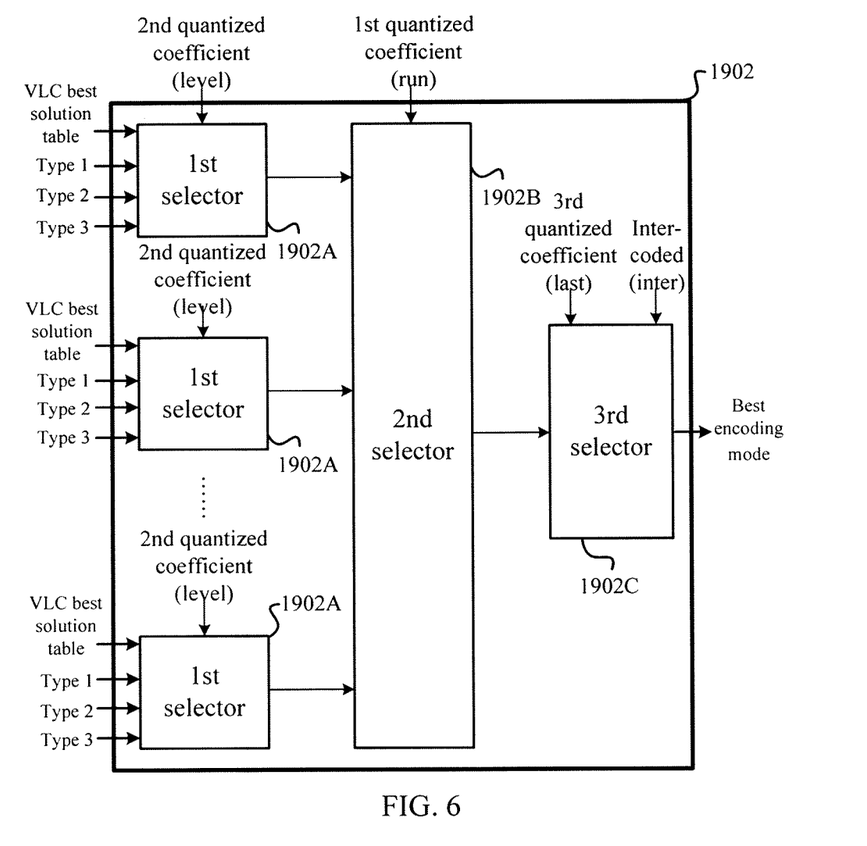

FIG. 6 depicts a schematic diagram of another operating approach of the coding mode arbitration mode 1902. It is noted that the difference between FIG. 6 and FIG. 5 is that the selector 1902A in FIG. 6 is utilized for matching the second quantized coefficient "level" of the set of quantized DCT coefficients, and the second selector 1902B in FIG. 6 is utilized for matching the first quantized coefficient "run" of the set of quantized DCT coefficients. That is to say, the matching sequence of the first quantized coefficient "run" and the second quantized coefficient "level" is not limited to a specific case, and the matching sequence does not affect a final arbitration result generated by the coding mode arbitration mode 1902, which is extremely different from the prior art that different determination is created due to the exchange of the matching sequence.

For example, when the set of quantized DCT coefficients of (2, 8, 0) is simultaneously adopted in the VLC modes Type 1 and Type 2 and is defined in the intra-coded table, in the prior art, the non-best coding mode Type 1 is selected to encode the set of quantized DCT coefficients to generate a Type 1 coding result "00000011, 0, 000011110s", having a non-shortest coding length comparing to a Type 2 coding result "0000011, 10, 010011 s", which also conforms to the coding rule. That is to say, the conventional media coding system cannot ensure best coding efficiency.

However, when the best coding mode is determined via the coding mode arbitration module 1902, since the above-mentioned three-layer selectors of the coding mode arbitration module 1902 perform matching with the VLC best solution table, the above erroneous judgment does not occur; thus, the coding mode arbitration module 1902 selects the best coding mode Type 2 to encode the set of quantized DCT coefficients, so as to obtain the shortest coding length and thereby best coding efficiency can be achieved.

Figure 7:
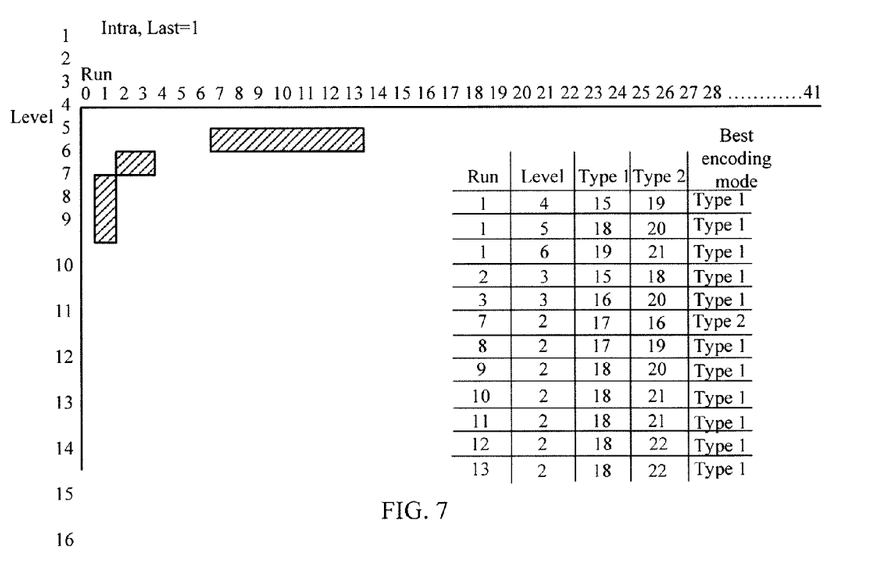
FIG. 7 is a schematic diagram of relative relationship between the DCT coefficients "run" and "level" and a best coding mode while the inter-coded table is adopted and the DCT coefficient "Last" equals to 1.

FIG. 7 is a schematic diagram of relative relationship between the DCT coefficients "run" and "level" and a best coding mode while the inter-coded table is adopted and the DCT coefficient "Last" equals to 1. An oblique line area in FIG. 7 represents the quantized DCT coefficients simultaneously adopted in Type 1 and Type 2. A list in FIG. 7 represents respectively the coding lengths of a set of quantized DCT coefficients in the oblique area according to Type 1 and Type 2, for determining a best coding mode. For example, supposing that a set of quantized DCT coefficients is (1, 4, 1), it can be seen in FIG. 7 that the set of quantized DCT coefficients (1, 4, 1) is simultaneously adopted in Type 1 and Type 2, and the best coding mode corresponding to the set of quantized DCT coefficients (1, 4, 1) is Type 1. Hence, the coding mode arbitration mode 1902 selects Type 1 as the best coding mode of the set of quantized DCT coefficients (1, 4, 1), and the coding module 1904 encodes the set of quantized DCT coefficients (1, 4, 1) according to Type 1, so as to achieve best coding efficiency.

In practice, the predetermined VLC table is the intra-coded table, for encoding two macro-blocks within a same frame, or the inter-coded table, for encoding two macro-blocks of two adjacent frames in a video stream. In addition, the set of quantized coefficients may be discrete cosine transform coefficients, but the present invention is not so limited.

When a determination result of the determination module 1900 is negative, the coding mode arbitration module 1902 determines the best coding mode corresponding to the set of quantized coefficients from a plurality of predetermined coding modes, according to a predetermined rule. The coding module 1904 encodes the set of the quantized coefficients according to the best coding mode. In practical applications, the predetermined rule is associated with coding lengths generated by encoding the set of quantized coefficients according to the plurality of predetermined coding modes.

More specifically, when a coding length obtained by encoding the set of quantized coefficient according to a predetermined coding mode of the plurality of predetermined coding modes is the shortest coding length, the coding mode arbitration module 1902 determines the predetermined coding mode as the best coding mode. A detailed structure and practical operating situations of the quantized coefficient coding apparatus 190 in this embodiment are similar to associated description in the first embodiment, and are therefore omitted herein.

Figure 8:
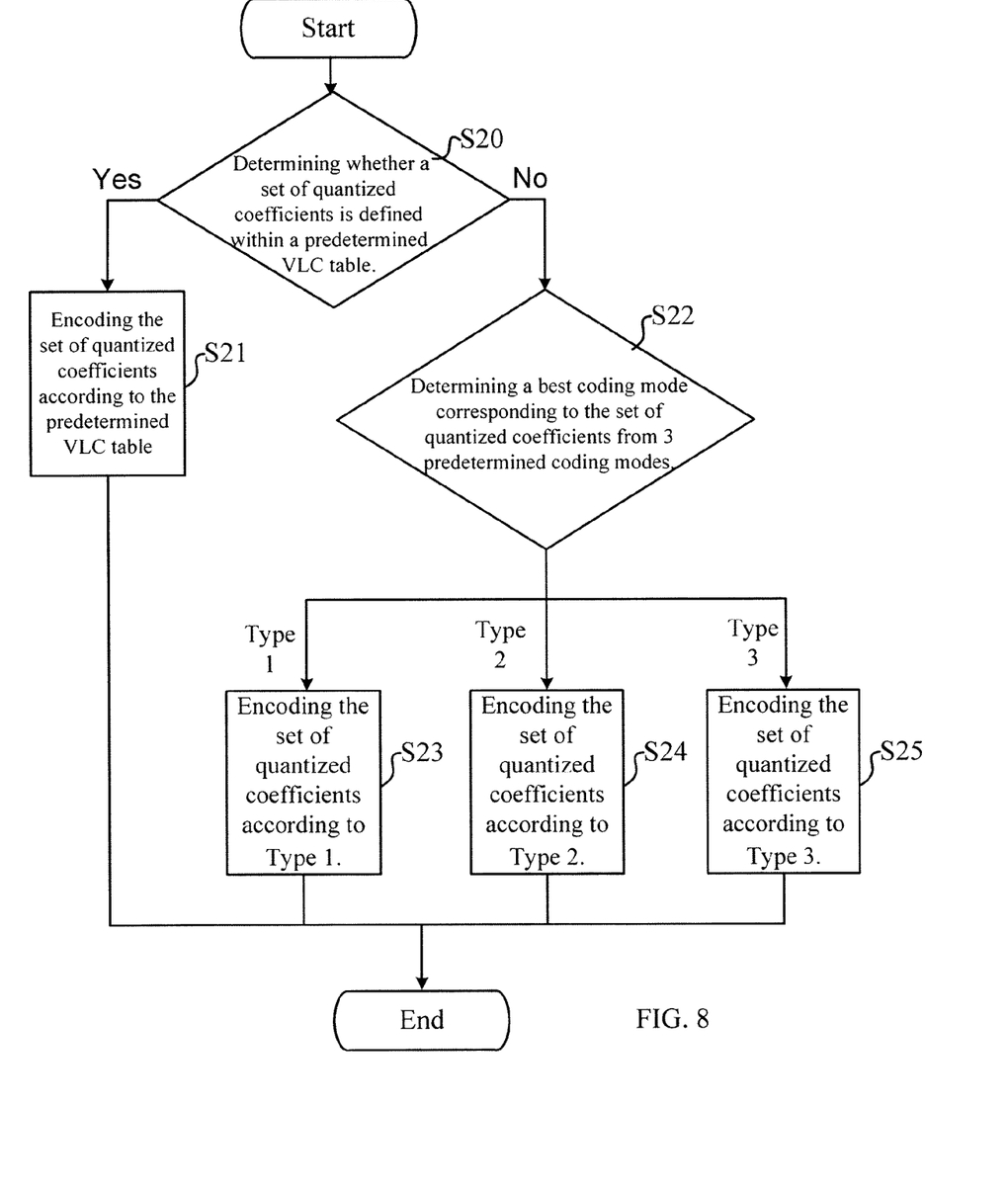
FIG. 8 is a flowchart of an operating method applicable to a quantized coefficient coding apparatus in accordance with a second embodiment of the present invention.

A third embodiment according to the present invention is a quantized coefficient coding apparatus operating method. In this embodiment, the quantized coefficient coding apparatus 190 is applied in the media coding system 1. FIG. 8 is a flowchart of the quantized coefficient coding apparatus operating method. In Step S20, the quantized coefficient coding apparatus 190 determines whether a set of quantized coefficient is defined within a predetermined VLC table. In practice, the VLC table conforms to the MPEG-4 video coding standard. The set of quantized coefficient comprises DCT coefficients.

When a determination result of Step S20 is positive, the process proceeds to Step S21 in which the set of quantized coefficients is encoded according to the predetermined VLC table. When the determination result of Step S20 is negative, the process proceeds to Step S22 in which a best coding mode corresponding to the set of quantized coefficients is determined from three predetermined coding modes according to a predetermined rule.

In practical applications, the predetermined rule is associated with coding lengths obtained by encoding the set of quantized coefficients according to the plurality of predetermined coding modes. When a coding length obtained by encoding the set of quantized coefficients according to a predetermined coding mode of the plurality of predetermined coding mode, the predetermined coding mode is determined as the best coding mode.

When the best coding mode determined in Step S22 is the first VLC mode (i.e., Type 1), the process proceeds to Step S23, in which the set of quantized coefficients is encoded according to the first VLC mode. When the best coding mode determined in Step S22 is the second VLC mode (i.e., Type 2), the process proceeds to Step S24, in which the set of quantized coefficients is encoded according to a second VLC mode. When the best coding mode determined in Step S22 is the third VLC mode (Type 3), the process proceeds to Step S25, in which the set of quantized coefficients is encoded according to the third VLC mode.

In conclusion, a quantized coefficient coding apparatus according to the present disclosure is capable of accurately selecting a best coding mode corresponding to a set of quantized coefficients and encoding the set of quantized coefficients according to the best coding mode; thus, the present invention is capable of avoiding the problem of encoding the set of quantized coefficients in a non-best coding mode and therefore fail to obtain the shortest coding length in the prior art. In view of this, a media coding system according to the present disclosure is capable of ensuring the shortest coding length to be obtained by encoding the set of quantized coefficients according to the best coding mode via the quantized coefficient coding apparatus, so as to optimize coding efficiency of the quantized coefficients.

In addition, in the present invention, since the determination rule adopted by the quantized coefficient coding apparatus for determining the best coding mode is extremely simple, software and hardware design of the conventional media coding system can be substantially simplified, thereby reducing production cost as well as increasing market competitiveness.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A quantized coefficient coding apparatus, comprising:
a determination module, for determining whether a set of quantized coefficients is defined in a predetermined variable length coding (VLC) table to generate a determination result and associating the predetermined variable length coding table to the quantized coefficients for encoding when the determination result is positive;
a coding mode arbitration module, coupled to the determination module, for determining a best coding mode, corresponding to the set of the quantized coefficients, from a plurality of predetermined coding modes according to a predetermined rule when the determination result is negative; and
a coding module, coupled to the coding mode arbitration module, for encoding the set of quantized coefficients according to the best coding mode or the predetermined variable length coding table,
wherein the coding arbitration module performs a two-layer process whereby a first selector performs matching between a given first quantized coefficient and associated best coding mode information stored in a best solution VLC table, and a subsequent second selector performs matching between a given second quantized coefficient and associated best coding mode information stored in the VLC best solution table such that one best coding mode is determined by the shortest length.

2. The quantized coefficient coding apparatus of claim 1, wherein the VLC table conforms to a Motion Picture Experts Group-4 (MPEG-4) video coding standard.

3. The quantized coefficient coding apparatus of claim 1, wherein the set of quantized coefficients comprises discrete cosine transform (DCT) coefficients.

4. The quantized coefficient coding apparatus of claim 1, wherein the predetermined rule is associated with coding lengths obtained by encoding the set of quantized coefficients with the predetermined coding modes.

5. The quantized coefficient coding apparatus of claim 1, wherein encoding the set of quantized coefficients with the plurality of predetermined coding modes results in a plurality of coding lengths and the coding mode arbitration module determines the predetermined coding mode corresponding to the shortest coding length as the best coding mode.

6. The quantized coefficient coding apparatus of claim 1, wherein the best coding mode corresponding to the set of quantized coefficients is stored in a look-up table.

7. The quantized coefficient coding apparatus of claim 1, wherein the VLC table is an intra-coded table, for performing intra-coding of each macro-block of each frame in a video stream.

8. The quantized coefficient coding apparatus of claim 1, wherein the VLC table is an inter-coded table, for performing inter-coding of each macro-block of each frame in a video stream.

9. The quantized coefficient coding apparatus of claim 1, wherein the first quantized coefficient is a run coefficient and the second quantized coefficient is a level coefficient.

10. A quantized coefficient coding method, applicable to a media coding system, the method comprising:
determining whether a set of quantized coefficients is defined in a predetermined VLC table to generate a determination result and associating the predetermined variable length coding table to the quantized coefficients for encoding when the determination result is positive;
determining a best coding mode corresponding to the set of quantized coefficients from a plurality of predetermined coding modes according to a predetermined rule when the determination result of the determination module is negative; and
encoding the set of quantized coefficients according to the best coding mode or the predetermined variable length coding table,
wherein determining a best coding mode comprises performing a two-layer process whereby a first selector performs matching between a given first quantized coefficient and associated best coding mode information stored in a VLC best solution table, and a subsequent second selector performs matching between a given second quantized coefficient and associated best coding mode information stored in the VLC best solution table such that one best coding mode is determined by the shortest coding length.

11. The method of claim 10, wherein the predetermined VLC table conforms to the MPEG-4 video coding standard.

12. The method of claim 10, wherein the set of quantized coefficients comprises discrete cosine transform coefficients.

13. The method of claim 10, wherein the predetermined rule is associated with coding lengths obtained by encoding the set of quantized coefficients with the plurality of predetermined coding modes.

14. The method of claim 10, further comprising: obtaining a plurality of coding lengths by encoding the set of quantized coefficients with the plurality of predetermined coding modes; and determining the predetermining coding mode corresponding to the shortest coding length as the best coding mode.

15. The method of claim 10, wherein the first quantized coefficient is a run coefficient and the second quantized coefficient is a level coefficient.

* * * * *